Nov. 8, 1960

D. L. GRAHAM ET AL  2,959,508
METHOD FOR EXPANDING THERMOPLASTIC RESINOUS
MATERIALS AND ARTICLES THEREBY OBTAINED

Filed Jan. 30, 1956  2 Sheets-Sheet 1

INVENTORS.
Donald L. Graham
Robert N. Kennedy
Earle L. Kropscott
BY Griswold & Burdick
ATTORNEYS Nov. 8, 1960  D. L. GRAHAM ET AL  2,959,508
METHOD FOR EXPANDING THERMOPLASTIC RESINOUS
MATERIALS AND ARTICLES THEREBY OBTAINED
Filed Jan. 30, 1956  2 Sheets-Sheet 2
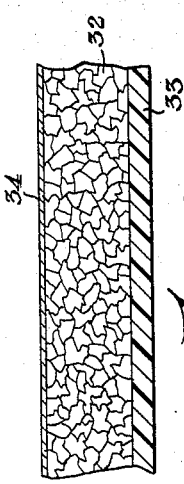
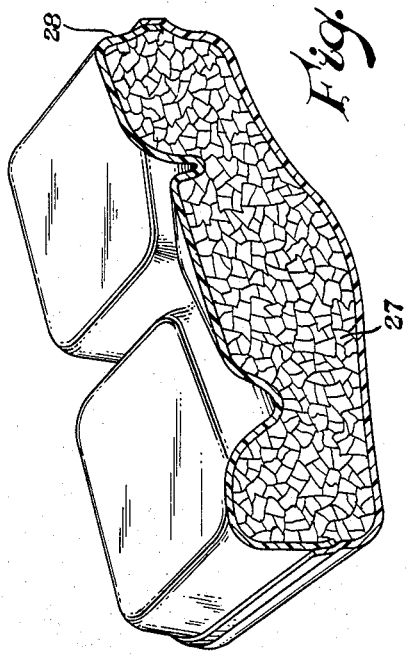
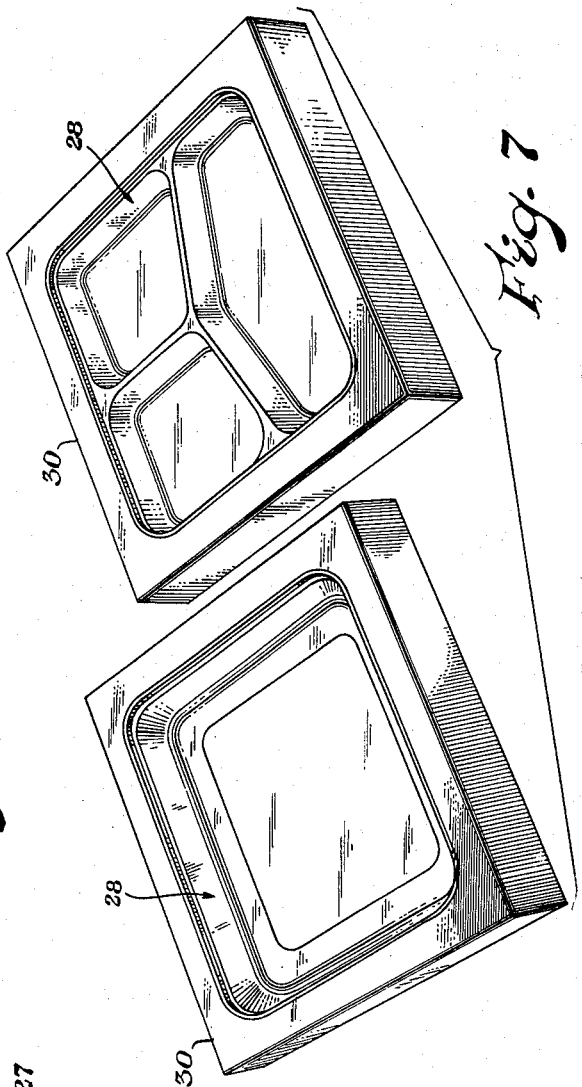
INVENTORS.
Donald L. Graham
Robert N. Kennedy
Earle L. Kropscott
BY Griswold & Burdick
ATTORNEYS

United States Patent Office 2,959,508
Patented Nov. 8, 1960

2,959,508

METHOD FOR EXPANDING THERMOPLASTIC RESINOUS MATERIALS AND ARTICLES THEREBY OBTAINED

Donald L. Graham, Robert N. Kennedy, and Earle L. Kropscott, Midland, Mich., assignors to The Dow Chemical Company, Midland, Mich., a corporation of Delaware Filed Jan. 30, 1956, Ser. No. 562,122

31 Claims. (Cl. 154—100)

This invention relates to an improved method for expanding or "foaming" thermoplastic resinous materials and to the articles which advantageously may be obtained by practice of the method. It has particular reference to a method for expanding thermoplastic resinous materials into molded shapes and to the molded articles thereby obtained, including certain composite or "sandwich" type constructions in which the foam confining mold form may be retained as an integral laminated part of the molded article.

Pursuant to the known art, a variety of thermoplastic polymeric and resinous materials may be expanded from a granular or bead form to assume a porous, cellular, solidified foam-like structure by the action of various propellants or agents for expanding or blowing the materials. The blowing agents, in accordance with common practice, are usually gases (or gas generating substances) or highly fugacious liquids which have been dissolved or otherwise intimately incorporated within the thermoplastic resinous material while it is in an unexpanded granular form. The application of heat to an unfoamed granular thermoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to expand it into the desired foam structure.

The heat energy which is required to soften the resinous material and release the blowing agent for the foam forming function is conventionally derived from an externally generated source. Thus, steam, hot air and other heat supplying means are ordinarily employed for the purpose of foaming the thermoplastic material.

Due to the usually low heat conducting properties of resinous materials and their greatly increased thermal insulating characteristics during their transformance into and assumption of a cellular foam structure, the foaming of resinous materials by the application of heat energy which is derived from externally generated sources introduces many operational difficulties and is frequently responsible for various dissatisfying results. In many instances the resulting foam structure may be insufficiently expanded or formed with an excessive non-uniformity, or both, and may be produced with other undesirable features and marks of poor quality. This is often the case even when the heat supplying means are passed internally within the material being foamed, as when steam probes and the like are utilized in foam molding apparatus.

In addition, the usual foam producing and foam molding apparatus is relatively complex, inconvenient to handle and operate, often because of certain included features which are designed to facilitate the heating of the thermoplastic resinous material being expanded. It would be advantageous to obviate these and other difficulties in the preparation of expanded foam and foam articles from thermoplastic resinous materials.

Therefore, it is among the principal objects of the present invention to provide an improved method for expanding thermoplastic resinous materials.

It is a related object to provide a method which does not depend on the use of heat energy derived from externally generated sources in order to accomplish the foam forming function.

A further object is to provide a facile method uninhibited by limitations of apparatus whereby foamed articles having improved characteristics can readily be obtained.

A still further object is to provide self-expanding masses comprised of expandable thermoplastic resinous materials which advantageously can be employed in the preparation of foam structures.

Another object is to provide superior foamed articles of thermoplastic resinous materials which have been prepared with the self-expanding masses and by the method of the present invention.

Yet another object is to provide molded articles having a sandwich construction comprised of a foamed interior which is enveloped in a tough layer or skin of relatively unfoamed thermoplastic or thermosetting resinous material, or both.

It is an additional object of the present invention to provide molded articles having a composite sandwich construction wherein the foam molded thermoplastic resinous material is retained in and structurally supports the foam confining mold form.

Other objects and advantages of the invention will be more apparent in the following description and specification.

According to the invention, a thermoplastic resinous material in discrete, granular form in which is incorporated a blowing agent may advantageously be expanded into a foam structure by mixing with the mass of unfoamed thermoplastic resinous material an exothermically self-reacting agent, hereinafter referred to as an "exothermus substance," which is inert to the expandable thermoplastic resinous material; and reacting the exothermus substance to generate sufficient heat within the mass to adequately soften the mass and cause expansion of the blowing agent in the discrete particles in the mass to expand the mass to a foam structure. Articles prepared according to the method of the present invention may either be relatively unconfined or completely molded foam structures. Advantageously, they may be molded foam structures and more advantageously, for certain purposes, they may be molded foam structures in which the foam confining mold is laminated to the foam structure and is retained as an integral part of the article, particularly when the reacted exothermus substance provides an adhesive effect between the expanded thermoplastic resinous material and the confining mold, so as to obtain strong sandwich panel constructions of various desired configurations.

Any thermoplastic resinous material which can be expanded or foamed by conventional techniques may advantageously be expanded according to the method of the present invention. Merely for purposes of convenient illustration, however, without intending to be restricted thereto, the invention will be predominantly described in connection with expandable granules of polystyrene, which may be in an essentially linear or cross-linked form, as being generally representative of expandable thermoplastic resinous materials and as being especially representative of alkenyl aromatic compounds which contain at least about 50 percent by weight of at least one alkenyl aromatic compound having the general formula $$Ar-CR=CH_2$$

wherein Ar is an aromatic radical and R is selected from the group consisting of a hydrogen atom and a methyl radical. Expandable, thermoplastic moldable polymers and copolymers of ar-methyl styrene or vinyltoluene, mono- and di-chlorostyrene and ar-dimethyl styrene may frequently be utilized with benefits commensurate to those which are derivable from employment of polystyrene. Often this may also be the case with other expandable thermoplastic resinous materials including those which may be comprised of polymers and copolymers of methyl methacrylate such as its homopolymer and the copolymers of methyl methacrylate and vinylidene chloride. The blowing agents employed for the expandable thermoplastic resinous material may be those which are commonly utilized including dichlorodifluoromethane, carbon dioxide and pentane or other low boiling hydrocarbons and other suitable materials such as heat sensitive gas generating agents and the like.

The exothermus substance which is an exothermically self-reacting agent may be any substance or mixture of substances which liberates substantial quantities of heat upon intra- or self-reaction. The heat may be generated as a result of a true chemical reaction or it may be caused by a physical or quasi-chemical type of interaction such as occurs when many substances are being dissolved. As indicated, the exothermus substance should be inert to the thermoplastic resinous material which is being formed. In other words, it should not enter into a chemical reaction with the resinous material so as to cause its decomposition or to otherwise alter its essential characteristics. Neither should it be physically reactive with the thermoplastic resinous material as by dissolving it or causing it to be excessively swollen. A slight softening or plastifying influence, however, may under certain circumstances have a benign effect to increase the volume of expanded material which may be attained by a given mass of thermoplastic resinous material.

It is particularly beneficial for the exothermus substance to be one which generates or reacts to a product having an adhesive effect upon the expanded thermoplastic resinous material, especially when molded articles or sandwich type constructions retaining the mold form are being prepared. This serves to reinforce the entire foam structure and produces an article of unusual sturdiness and high strength. Exothermus substances which self-react to adhesive products provide an unusually tough skin of incompletely foamed granules of the expandable thermoplastic resinous material when it is foamed to a molded structure. Exothermus substances of this nature are particularly beneficial when a composite sandwich construction retaining the mold form is involved, in which case the adhesive product of the exothermus substance bonds and tightly laminates the molded foam to the integral mold form.

The quantity of the exothermus substance which is employed depends upon its exothermic heat of self-reaction and the quantity of heat which is required by a given mass of unfoamed thermoplastic resinous material in order to bring it to an optimum temperature to be foamed by the thermally expanding blowing agent in the discrete particles in the mass. It also depends on the final foam density which is desired, since the application of relatively greater quantities of heat generally produces greater volumes of expanded resinous material.

A sufficient quantity of the exothermus substance should be employed to raise the temperature of the unfoamed mass of thermoplastic resinous material to a foaming temperature. Most expandable polystyrene and like materials, for example, require a temperature of at least about 185–190° F. for this purpose. Conversely, the employment of excessive amounts of the exothermus substance should be avoided to preclude overheating and thermally degrading or decomposing the expanded thermoplastic resinous material. Certain types of foamable polystyrene and similar beads may be caused to collapse after they have been expanded when they are subjected to a temperature in the range from 275° F. to 400° F. and may decompose at higher temperatures.

In many instances, particularly where a "hot" or exceptionally self-reactive exothermus substance is employed, or relatively large masses of thermoplastic resinous material are being foamed, it may be expedient to employ a coolant or heat absorbing agent in the self-expanding mass, such as a liquid which is vaporizable at a beneficial temperature within the operating temperatures involved. This prevents local overheating which might result from an excessive heat of reaction generated by an exothermus substance and which otherwise might not be adequately diffused through the insulating expanding foam structure. Such a practice may be utilized with advantage to avoid the undesirable consequences of local overheating.

The exothermus substance may advantageously be a monomeric material or an already partially polymerized material which is capable of undergoing an exothermic polymerization with or without the assistance of initiators, polymerization catalysts or curing agents. It may be liquid or solid, although liquids frequently allow a more intimate mixture of the exothermus substance to be achieved with the unfoamed thermoplastic resinous material. A more thorough and intimate mixture provides for a more efficient and uniform internal heating effect.

The precursors of epoxide (or epoxy) resins or uncured or low molecular weight epoxide resins, including those resins produced by reacting in one or more stages polyhydric phenols, such as bisphenols, or polyhydric alcohols with epihalohydrins, polyhalohydrins or polyepoxides are particularly advantageous for purposes of providing heat by self-reaction for expanding polystyrene granules and like expandable resins of thermoplastic alkenyl aromatic compounds and other expandable thermoplastic resinous materials in accordance with the present invention. Epoxy resins in general are curable with considerable liberation of heat when such curing agents as substituted formaldehydes, polyhydric phenols, polybasic acids, polyamines and polyamides are employed. They are usually available in a liquid form and provide excellent adhesive materials upon curing. A dihydric phenol-epichlorohydrin material, such as a bisphenol A-epichlorohydrin resin, which is readily curable with polyamines may be employed with especial benefit as an exothermus substance to provide an internal, self-reacting heat source for expanding polystyrene and similar or equivalent expandable thermoplastic resinous materials. "Bisphenol A" is a common designation for 4,4'-dihydroxy diphenyl dimethyl methane. Such a resin may conveniently be cured upon addition of between about 6 and 40 parts by weight, per hundred parts by weight of the self-reacting bisphenol A-epichlorohydrin resin, of a polyamine such as triethylene tetramine or diethylene triamine or mixtures of the two, although it is often simpler and more desirable to employ only a single curing agent. As will be appreciated by those who are skilled in the art, the actual amount of curing agent that is employed may vary depending on the particular equivalent weight of the polyamine that is involved. The optimum amount of such exothermus, substances for any particular application may vary not only with the particular resin and curing agent which is employed but with the quantity of the mass being expanded and the heat retaining or insulating characteristics of the configuration into which it is being molded.

Epichlorohydrin-resorcinol condensation resins, epoxylated novolak resins and other self-condensing phenolic resins are examples of other curable self-reacting materials which may advantageously be employed as exothermus substances in the practice of the invention.

The method of the present invention is adapted to cause unfoamed granules of polystyrene, for example, to be volumetrically expanded between about 3 and 15 times or more their initial volume to foam structures which have densities in correspondence with their expanded volumes. Relatively larger size granules usually tend to produce more dense foams. Ordinarily the greatest foaming efficiency can be obtained by a liquid exothermus substance such as a self-reacting liquid resin that will thoroughly wet and enfilm the unfoamed beads of polystyrene or other expandable thermoplastic resinous material. Although the requirements may vary under differing conditions of foaming and foam molding, each part by weight of expandable polystyrene granules may ordinarily be caused to foam suitably as a result of the internal heat which is generated by as little as about 0.3 part by weight of an epoxide resin, such as a bisphenol A-epichlorohydrin resin, when it has been mixed with suitable quantities of a curing agent. As mentioned, however, the most desirable amount of exothermus substance to be employed will vary with the quantity of the mass being expanded and the shape or form in which it is being molded. As a rule, relatively greater masses of the expandable thermoplastic resinous material and configurations of such masses which have high volume to low surface area ratios require less of the exothermus substance to generate adequate quantities of heat for their satisfactory foaming. The converse, likewise, is generally true. Relatively smaller masses and low volume to high surface area ratios usually require greater amounts of the exothermus substance in order to be foamed satisfactorily due to their smaller insulating and heat-retaining capacities.

Ordinarily, a suitable self-expanding mass for a wide variety of foaming applications for expandable polystyrene and the like may be obtained by employing a weight ratio of self-reacting epoxide rosin to the expandable polystyrene in the neighborhood of about 1.5–1.6 to 1. It is oftentimes advantageous for the self-expanding mass to be employed in an amount which contains at least about 100 grams of the expandable thermoplastic resinous materials. Difficulty may sometimes be encountered when self-expanding masses comprised of lesser quantities are employed due to the mentioned fact that the heat of reaction from the exothermus substance may not be effectively confined within such a relatively smaller unfoamed mass to permit it to be expanded suitably. In some instances, however, relatively smaller masses may be employed if the self-reacting exothermus substance is preheated to a slight degree before being mixed in the self-expanding mass.

Frequently, as has been indicated, the addition of a coolant such as methanol, ethanol and the like to the self-expanding mass in an amount between about 3 and 20 percent by weight, based upon the weight of the expandable thermoplastic resinous material, is useful to prevent local overheating effects. The precise optimum quantity of the coolant which is best employed in particular instances will also vary with the quantity and configuration of the expandable mass, the type of exothermus substance employed and other factors such as the heat of vaporization of the particular coolant which is utilized. Other vaporizable liquid materials may also be suitably employed as coolants or heat absorbing agents. Like the self-reacting exothermus substance, the coolant should be inert to the extent of not spoliating the effect of the other components employed in the self-expanding mass. While a sufficient quantity of the coolant should be used in order to efficiently control the heat of the exothermic reaction, the use of excessive amounts should be avoided so that an over-cooling effect is not encountered and to circumvent the possibility of forming void spaces in the foamed article due to the inordinate vaporization of the coolant.

In many instances when resinous exothermus substances such as epoxide resins are employed, a foamed article of relatively lighter density may be obtained by incorporating a separate blowing agent in the self-expanding mass for the self-reacting agent. Thus, various gas generating substances such as those which generate nitrogen under the influence of heat may advantageously be employed to expand the self-reacting agents. A nitrogen generating compound such as p,p'-oxy-bis-(benzene sulfonyl hydrazide), similar to that which is obtainable under the trade-name "Celogen" from the Naugatuck Chemical Company, is especially useful for expanding various epoxide resin self-reacting agents. Generally an amount of the separate blowing agent for an epoxide resin exothermus substance which is in the neighborhood of about 2 percent by weight, based on the weight of the self-reacting agent, may be suitably employed.

For many foam molding applications a typical suitable formulation for the preparation of a self-expanding mass in accordance with the present invention may be comprised of about 160 parts by weight of expandable polystyrene granules containing dichlorodifluoromethane as a blowing agent in the amount of about 10–15 percent by weight, based on the weight of the polystyrene; an exothermus substance consisting of about 100 parts by weight of a bisphenol A-epichlorohydrin resin, about 10 parts by weight of diethylenetriamine and about 15 parts by weight of triethylene tetramine; and about 10 parts by weight of ethanol. If desired, although it is not necessary for suitable foaming, about 2 parts by weight of such a gas generating agent as "Celogen" may be employed as a separate blowing agent for the epoxide resin. Alternatively, the curing agent for the resin in the exothermus substance may consist of about 15–25 parts by weight of diethylene triamine individually employed or about 20–35 parts by weight of triethylene tetramine utilized as the sole curing agent.

A thorough and intimate mixing of all the ingredients is usually essential in order to obtain optimum results in the practice of the method of the present invention.

When the exothermus substance is a liquid, as in the case of many of the utilizable epoxide resins, it may be beneficial to employ dispersants or wetting agents so that a better and more uniform mixing of the ingredients may be obtained. It is usually convenient to mix the unfoamed granular thermoplastic resinous material with the exothermus substance and with any other ingredients such as curing agents and coolants which may be employed before the admixed self-expanding mass is added to a mold or other forming container in order to be foamed.

Additional features and advantages of the present invention will be apparent in connection with the accompanying drawing depicting several foam molded articles, each of which is typical of those obtainable with a self-expanding mass comprised of polystyrene or polyvinyltoluene and an epoxide resin-containing, self-reacting exothermus substance, in which;

Figures 3 through 6 are perspective views, in section, of various types of composite sandwich panel constructions which are readily obtainable with foam moldings prepared in accordance with the present invention;

Figure 7 perspectively depicts a type of reinforcing mold which advantageously may be employed for composite sandwich construction articles molded in retained thermoplastic forms; and Figure 8, in a fragmentary sectional view, illustrates still another type of sandwich panel construction.

Figure 1:
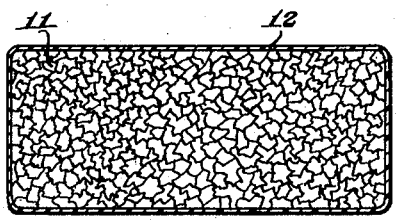
Figure 1 is a cross-section of a foam molding prepared according to the method of the present invention.

With initial reference to Figure 1 there is generally shown, in cross section, a foam molding 10 having a porous foamed interior portion 11 enveloped within a tough outer skin layer 12. The foam molding 10 is typical of those which may be prepared in molds in accordance with the method of the present invention. The outer skin layer 12 is comprised of incompletely foamed granules of the thermoplastic resinous materials which are forced into contact with the relatively cool surface of the mold by the rapid expansion of the inner foaming granules and are prevented from completely expanding by the resultant cooling effect of the mold. The reaction product of the self-reacting, resinous, exothermus substance which is employed assists to hold the outer layer of beads adhesively together as the relatively thin and tough skin 12. This advantageously provides a sandwich construction for the foamed article.

Figure 2:
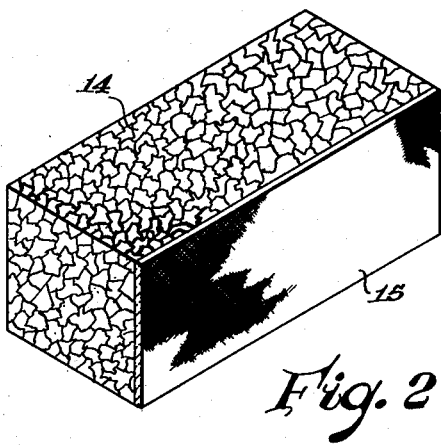
Figure 2 is a perspective view of a foam molding laminated to a fabric to provide a particular type of sandwich panel construction.
Figure 3:
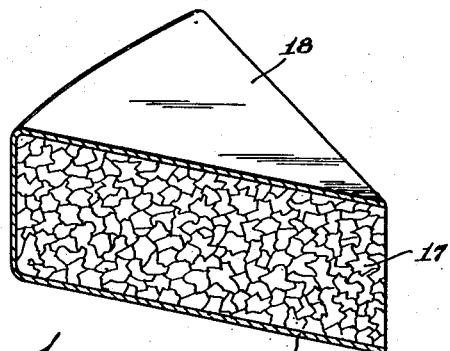
Figure 5:
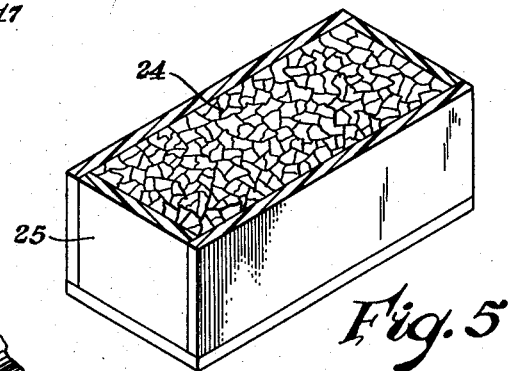
Figure 4:
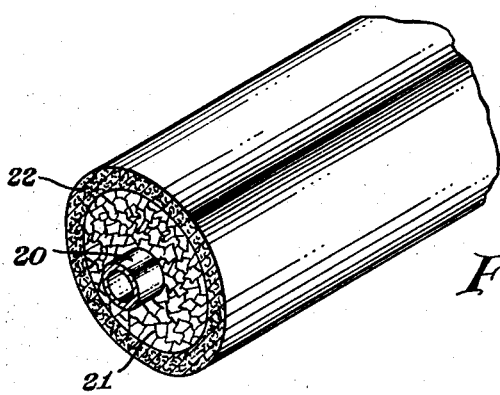

In Figure 2 a foam molding 14 is laminated, as a composite article, to an outer skin of glass fabric 15 to provide a varied type of sandwich construction. The glass fabric 15 may be laminated to the foam molding by placing the fabric next to the mold wall before adding the self-expanding mass to the mold cavity for foaming. The pressure of the expanding mass and the adhesive effect of the reacted resinous exothermus substance results in a strong lamination between the fabric and the foam to provide a useful article. Other cloth and fabrics such as canvas may frequently be suitably substituted for the glass fabric 15. The composite sandwich panel construction article depicted in Figure 3 may be obtained by foam molding a self-expanding mass to a foam structure 17 between relatively thin metal panels 18 which are employed as the foam confining mold form and retained as an integral part of the article by the adhesive action of the reacted epoxide resin-containing exothermus substance. Such an article may be made to have great strength and rigidity, even though relatively thin metal outer panels are employed, due to the structural reinforcement which is provided by the contained foam structure. An effectively insulated pipe 20 is depicted in Figure 4. The pipe is imbedded in and surrounded by the foam structure 21 which is annularly expanded in place between the pipe 20 and an outer cylindrical confining form 22 which advantageously may be paper or cardboard tubing or the like. Figure 5 illustrates a sandwich panel produced by foaming a self-expanding mass to a foam structure 24 confined between relatively thick, tightly adhering sheets of a plastic material such as polystyrene which are retained as an integral part of the composite article by the bond which is obtained by reason of the adhesive properties of the product of the reacted exothermus substance.

In Figure 6 a sandwich panel construction article of complex shape is depicted wherein the foam structure 27 is confined between relatively thin, irregularly contoured sheets 28 of a thermoplastic material retained as an integral part of the composite article. The preparation of such articles may advantageously be accomplished by employing reinforcing or retaining molds 30, as shown in Figure 7, for the thermoplastic foam confining mold forms 28 in order to prevent a dimensional change of the thermoplastic forms 28 due to the heat generated by the foaming, self-expanding mass. The reinforcing molds 30 for such purpose may advantageously be made of a refractory material such as a magnesium oxychloride cement or the like or other functionally similar materials. Such reinforcing molds, as illustrated, should conform closely to the contour of the thermoplastic foam containing form.

An article, as represented in Figure 8, may advantageously be prepared according to the method of the invention by confining the foam molding 32 between a plastic sheet 33 on one side and a metal sheet 34 on the other. Sandwich panel articles of this type may find advantageous application for such use, by way of example, as refrigerator doors, wherein it may be desirable to have a metal exterior and a plastic interior side in a strong, rigid, well insulated construction.

Further illustration of the invention is provided in and by the following examples wherein, unless otherwise indicated, all parts and percentages are to be taken by weight.

EXAMPLE I

A self-expanding mass was prepared by mixing, with efficient agitation, about 200 grams of a bisphenol A-epichlorohydrin epoxide resin similar to that which may be obtained under the trade-name "Epon 828" from the Shell Chemical Co. with 10 cubic centimeters of ethanol. The resin was prewarmed to a temperature of about 90° C. prior to the formulation. To the mixture, with continued stirring, there was slowly added about 125 grams of unfoamed polystyrene granules having a mean diameter of about 1.4 millimeters and containing about 13 percent of dichlorodifluoromethane as a blowing agent. Stirring was continued until a uniform mixture was obtained, after which about 40 cubic centimeters of triethylenetetramine was added, with further stirring. The self-expanding mass, having a volume of about 333 cubic centimeters, was then poured into the cavity of a 230 cubic inch hollow brass mold wherein it was allowed to foam without the addition of heat from an externally generated source. A foam molded article similar to that depicted in Figure 1, was obtained. The molding had a tough skin layer and a uniformly foamed interior structure. It had an interior density of about 5 pounds per cubic foot. The procedure may be repeated successfully with the same ingredients excepting the ethanol in the self-expanding mass when foam moldings having a high surface area to volume ratio are prepared.

EXAMPLE II

The general procedure of Example I was repeated in order to prepare a self-expanding mass consisting of about 125 grams of "Epon 828"; about 20 grams of "Epon 562," an epoxylated glycerol resin which also is available from the Shell Chemical Co.; about 125 grams of unfoamed polystyrene granules; about 35 cubic centimeters of triethylenetetramine; about 10 cubic centimeters of diethylenetriamine; about 10 cubic centimeters of ethanol; about 2 drops of a nonionic surfactant material; and about 2 grams of "Celogen" as a separate blowing agent for the epoxide resin. The epoxide resin was employed at room temperature and the unfoamed polystyrene granules and the amines were added finally in sequential respective order to the mixture using the same mold as in Example I. The volume of the charge was about 299 cubic centimeters. A similar excellent quality, uniform foam molding having a density of about 3.3 pounds per cubic foot was obtained. The results were essentially duplicated when the procedure was repeated without the "Celogen" in the self-expanding mass.

EXAMPLE III

A self-expanding mass was prepared with a mixture of about 3 pounds of "Epon 828"; 4.75 pounds of unfoamed polystyrene granules; 136 grams of diethylenetriamine; 194 grams of triethylenetetramine; 136 grams of ethanol and 23 grams of "Celogen." The mass was foamed in an open top fiber board drum to a uniform, high quality foam structure having an expanded volume about 15 times greater than its original volume and an average density of about 4.5 pounds per cubic foot.

EXAMPLE IV

Using self-expanding masses which were formulations similar to those employed in the first two examples, composite articles similar to those depicted in Figures 2 through 5 of the drawing were obtained by foaming the mass against glass fabric in a mold, in metal and relatively thick sheet plastic mold forms and around a pipe in the annular space between the pipe and a larger cylindrical cardboard tube.

EXAMPLE V

Two self-expanding mass formulations were prepared. The first, having a volume of about 521 cubic centimeters, was comprised of about 200 grams of "Epon 828" (employed at a temperature of about 90° C.); 320 grams of unfoamed polystyrene beads similar to those employed in Example I; 30 grams of triethylenetetramine; 20 grams of diethylenetriamine; and 4 grams of "Celogen." The second consisted of about 80 grams of "Epon 828" (also employed at 90° C.); 130 grams of unfoamed polystyrene granules; 12 grams of triethylenetetramine; 8 grams of diethylenetriamine; and 1.6 grams of Celogen. The volume of the second self-expanding mass was about 210 cubic centimeters. Both were prepared and employed in a manner analogous to that of the first two examples. They were expanded in an irregularly contoured mold form of thin thermoplastic polystyrene sheet having a volume of about 128 cubic inches in order to produce a composite, sandwich construction, foam molded article similar to that which is depicted in Figure 6 of the drawing. A reinforcing mold, as illustrated in Figure 7, was employed. The reinforcing mold, shaped to the contour of the thermoplastic foam confining mold, was prepared from a magnesium oxychloride cement of conventional composition. The thermoplastic foam containing mold forms were placed in the reinforcing mold and separated therefrom by a thin Saran film in order to prevent sticking and to facilitate removal of the foam molded sandwich article. After addition of the self-expanding mass to the thermoplastic forms, the reinforcing molds which retained the closely fitting forms were clamped together until completion of the foaming. The density of the foam structure from the first formulation was about 16.9 pounds per cubic foot. The second formulation produced a foam sandwich structure having a density of about 6.88 pounds per cubic foot. Each of the articles contained a uniform foam structure which was tightly bonded to the thermoplastic mold forms to provide a strong and rigid sandwich panel.

EXAMPLE VI

The following formulations were successfully foamed as self-expanding masses in accordance with the general procedure of the foregoing examples:

(A)

160 parts of finely divided granules of expandable polymethylmethacrylate containing dichlorodifluoromethane as a blowing agent.
300 parts "Epon 828" at 90° C.
10 parts diethylene triamine
15 parts triethylene tetramine
10 parts ethanol
2 parts "Celogen"

(B)

90 parts of finely divided granules of an expandable copolymer of methyl methacrylate and vinylidene chloride containing about 65 percent by weight of methyl methacrylate polymerized in the copolymer molecule with dichlorodifluoromethane incorporated as a blowing agent.
57 parts "Epon 828" at 90° C.
5.7 parts diethylene triamine
8.5 parts triethylene tetramine
5.7 parts ethanol

EXAMPLE VII

Several different self-expanding formulations were prepared with various types and varieties of expandable thermoplastic granules. Each formulation was prepared with about 100 grams of the unfoamed beads which were added to about 160 grams of "Epon 828" which had been preheated to about 90° C. About 10 grams of ethanol and 10 grams of diethylene triamine with 15 grams of triethylene tetramine were then sequentially added to the mixture and stirred for about a minute. Each of the self-expanding formulations was then permitted to foam in a 600 milliliter beaker. The height of the resulting foam structure was noted along with other of its characteristics. The results are given in the following Table I. All the granules excepting those in run E, which contained pentane, had dichlorodifluoromethane incorporated as a blowing agent. The beads in runs H, I and J were crosslinked with about 0.06 percent of divinylbenzene.

*Table I*

| Run | Type of Expandable Granule | Average Bead Size, mm. | Height of Foam Structure, inches | Remarks |
|---|---|---|---|---|
| A | High molecular weight uncrosslinked polystyrene. | 0.6 x 0.8 | 10 | uniform foam structure. |
| B | Uncrosslinked polystyrene. | 0.8 x 0.8 | 8.5 | Inferior foam structure. |
| C | High molecular weight uncrosslinked polystyrene. | 1.6 | 10.25 | Slight non-uniformity in foam structure. |
| D | ...do... | 0.3 x 0.8 | 9.25 | uniform foam structure. |
| E | Uncrosslinked polystyrene. | 0.8 x 1.0 | 9.5 | uneven foam structure—some shrinkage. |
| F | High molecular weight uncrosslinked polyvinyltoluene. | 0.4 x 0.8 | 12.0 | uniform foam structure. |
| G | Uncrosslinked polyvinyltoluene. | 0.7 x 0.8 | 10.25 | Do. |
| H | Crosslinked polystyrene. | 1.4 | 13.25 | Exceptionally strong foam structure. |
| I | Crosslinked polyvinyltoluene. | 0.7 x 0.8 | 13.5 | Uniform foam structure. |
| J | ...do... | 1.4 | 11.5 | Do. |

EXAMPLE VIII

Following the procedure of Example VII, a self-expanding formulation consisting of 160 grams of expandable polyvinyltoluene beads crosslinked with about 0.06 percent of divinylbenzene and containing dichlorodifluorobenzene as a blowing agent; 100 grams of "Epon 828" at 90° C.; 10 grams of ethanol; and 30 grams of dipropylenetriamine was foamed in a 600 milliliter beaker to a foam structure having a height of about 10.25 inches. The approximate volume change of the expanded mass from the volume of the unexpanded formulation was about 5.5 times.

In the following tabulation (Table II) there is given the results which were obtained when varied proportions of diethylene triamine (DETA) and triethylenetetramine (TETA) were employed as curing agents for the "Epon 828" in formulations similar to the foregoing wherein dipropylenetriamine was used. In each case 100 grams of the resin, 160 grams of the polyvinyltoluene beads and 10 grams of ethanol were employed for preparation of the self-expanding mass. The volumes of the foam structures were determined by a water displacement technique after their expansion in 600 milliliter beakers.

EXAMPLE IX

A phenolic resin obtained from the General Electric Company under their trade-designation "G.E. Phenolic Resin No. 12313," a phenolic resin of the type described in U.S. Patent No. 2,446,429, was employed as an exothermus substance for foaming expandable polyvinyltoluene beads. About 100 parts of the resin was mixed with 10 parts of an activating material for the resin which was also obtained from the General Electric Company under their trade-designation "G.E. No. 12502 acid activator," a water solution of phenolsulfonic acid. This mixture was employed successfully to expand about 160 parts of polyvinyltoluene beads similar to those which were employed in Example VIII.

In other self-expanding masses which were formulated, an epoxylated novolak resin (Novolak) having an epoxide equivalent of about 175 and an epichlorohydrin-resorcinol condensation resin (Resorcinol) having an epoxide equivalent of about 125 were employed as the exothermus substances. The following Table III lists the formulations employed and the results obtained with these materials as exothermus substances. The procedure for formulating and expanding the self-expanding

*Table II*

| Run | Curing Agent, gms. | Foam Struc. Dimensions, Ht./Dia. of Head, in. | Approx. Volume Change | Apparent Density, lbs./ft.³ | Remarks |
|---|---|---|---|---|---|
| A | 10 DETA / 15 TETA | 13.5 / 7.75 | 9.7 | 6.4 | Excellent foam structure. |
| B | 13.8 DETA | 10.75 / 5.5 | 5.8 | 9.5 | Stoichiometric am't DETA. |
| C | 20.7 DETA | 13.25 / 6.75 | 9.8 | 6.1 | 50% excess DETA. |
| D | 27.6 DETA | 12.5 / 7.5 | 9.8 | 6.1 | 100% excess DETA. |
| E | 19.6 TETA | 12.5 / 6.5 | 7.6 | 7.6 | Stoichiometric am't TETA. |
| F | 29.4 TETA | 13.0 / 7.0 | 9.1 | 6.6 | 50% excess TETA. |
| G | 39.2 TETA | 12.5 / 7.5 | 9.2 | 6.8 | 100% excess TETA. |
| H | 5.1 DETA / 7.6 TETA | — / 5.5 | 5.4 | 11.1 | 75% of stoichiometric am't in 2/3 ratio DETA/TETA. |
| I | 6.8 DETA / 10.2 TETA | 12.0 / 6.5 | 7.0 | 8.4 | Stoichiometric am't in 2/3 ratio DETA/TETA. |
| J | 13.8 DETA / 19.6 TETA | 13.0 / 7.75 | 8.9 | 6.8 | Similar to Run A. |
| K | 13.5 DETA / 20.3 TETA | ............ | 9.1 | 7.3 | 100% excess in 2/3 ratio DETA/TETA. |

Note.—DETA is diethylenetriamine; TETA is triethylenetetramine.

masses was similar to that which was employed in Examples VII and VIII. The polyvinyltoluene beads were similar to those which were used in run I in Table I of Example VII. The polystyrene beads were the same as those which were used in run H of the same table.

*Table III*

| Run | Formulation of Self-Expanding Mass, ingredients in grams | Volume of Foam Structure, ml. | Approx. Volume change | Apparent Density, lbs./ft.$^3$ |
|---|---|---|---|---|
| A | 100 Novolak at 90° C.<br>160 Polyvinyltoluene beads<br>10 DETA<br>15 TETA<br>10 ethanol | 2,700 | 9 | 6.5 |
| B | 100 Novolak at 90° C.<br>160 Polystyrene beads<br>10.9 DETA<br>16.3 TETA<br>10 ethanol | 2,460 | 8.5 | 7 |
| C | 100 Resorcinol at 90° C.<br>160 Polyvinyltoluene beads<br>15.2 DETA<br>22.8 TETA<br>10 ethanol | 3,600 | 12 | 5 |
| D | 100 Resorcinol at 90° C.<br>160 Polyvinyltoluene beads<br>10 DETA<br>15 TETA<br>10 ethanol | 3,440 | 12 | 5 |
| E | 100 Resorcinol at R.T.<br>160 Polyvinyltoluene beads<br>15.2 DETA<br>22.8 TETA<br>10 ethanol | 2,740 | 9 | 7 |
| F | Same as Run E | 2,520 | 9 | 7.5 |

NOTE.—DETA is diethylenetriamine; TETA is triethylenetetramine; R.T. is room temperature.

EXAMPLE X

The effects of employing alcohol and "Celogen" in self-expanding masses is illustrated by the results set forth in the following Table IV. The formulations were prepared and expanded in 600 milliliter beakers in a manner similar to the procedure set forth in Examples VII, VIII and IX. The polyvinyltoluene beads were the same as those which were employed in run I of Table I in Example VII.

*Table IV*

| Run | Formulation of Self-Expanding Mass, ingredients in grams | Volume of Foam Structure, ml. | Approx. volume change | Apparent Density, lbs./ft.$^3$ | Remarks |
|---|---|---|---|---|---|
| A | 100 "Epon" 828<br>160 beads<br>10 DETA<br>15 TETA<br>10 ethanol<br>12 "Celogen" | 2,970 | 10 | 6 | Exceptionally large cells in foam structure. |
| B | Same as A without ethanol | 1,620 | 5.5 | 10.5 | Two 1" voids in middle. |
| C | Same as A without "Celogen" | 2,850 | 10 | 6.5 | |
| D | Same as A without ethanol or "Celogen" | 1,410 | 5 | 12 | |

As is apparent, the presence of "Celogen" in the self-expanding mass promotes only a slight improvement in the foam structure. In many instances, especially when greater economy may be a significant consideration, it may be advantageous to employ self-expanding masses which do not contain separate blowing agents for the exothermus substance.

EXAMPLE XI

Results similar to the foregoing were obtained when equal amounts of methanol was substituted for the ethanol as a coolant in various of the self-expanding mass formulations.

The articles which may be prepared by the method of the present invention, particularly sandwich construction articles, may be advantageously employed as insulation for low temperature applications such as in or around pipe and ducts or as insulating tile. They may also find wide application in the refrigeration field for doors, baffles, separators, food liners, freezer chests and for such uses as in food dispensing machines and the like. Sandwich constructions in accordance with the invention may be beneficially utilized for their buoyant characteristics by being utilized in boats, buoys, pontoons, docks, bulkhead fillers and the like. They may also be used for various laminated sandwich constructions with metal, wood, glass and glass cloth, concrete, plastic materials and the like to form rigid, high strength, foam-reinforced articles. The present invention may also be practiced to fill the tips of airplane wings, for example, and other aircraft parts in order to secure greater strength in them and in the manufacture of such items as skis and various protective articles of clothing such as sun hats and safety headgear for both recreational and industrial purposes. Machine cases, luggage, furniture, mannikins, advertising display items and theatrical props such as breakaway items may advantageously be provided in accordance with the invention. In addition, the invention may be employed for various packaging purposes and to encapsulate and embed electrical components in an insulating matrix as well as in oil well casings and to provide various molds and forms for such installations as culverts and the like. Many other applications and uses for the present invention exist which are of equivalent significance and importance to the few which have been mentioned.

Certain changes and modifications in the practice of the present invention can be readily entered into without departing substantially from its intended spirit and scope. Therefore, it is to be fully understood that the invention is not to be considered as being limited or in any way restricted by the preferred embodiments thereof which are set forth in the foregoing description and specification. Rather, it is to be interpreted and construed in the light of what is set forth and detailed in the hereto appended claims.

What is claimed is:

1. Method for expanding into a foam structure an expandable granular thermoplastic resinous material containing a blowing agent incorporated in its discrete particles which comprises mixing with an unfoamed mass of the thermoplastic resinous material a quantity of a self-reacting exothermus substance which is inert to the expandable thermoplastic resinous material in an amount adequate upon self-reaction to generate sufficient heat to raise the temperature of the unfoamed mass to a foaming temperature without thermal degradation thereof and reacting the exothermus substance to generate sufficient heat within the mass to soften the mass and cause expansion of the blowing agent in the discrete particles in the mass to expand the mass to a foam structure.

2. Method for expanding into a foam structure an expandable granular thermoplastic resinous material containing a blowing agent incorporated in its discrete particles which comprises mixing with the unfoamed mass of the thermoplastic resinous material a quantity of a self-reacting exothermus substance which is inert to the expandable thermoplastic resinous material in an amount adequate upon self-reaction to generate sufficient heat to raise the temperature of the unfoamed mass to a foaming temperature without thermal degradation thereof and a vaporizable, heat-absorbing coolant liquid; and reacting the exothermus substance to generate sufficient heat within the mass to soften the mass and cause expansion of the blowing agent in the discrete particles in the mass to expand the mass to a foam structure wherein excessive heat is dissipated by vaporization of said coolant liquid.

3. Method for expanding into a molded foam structure an expandable granular thermoplastic resinous material containing a blowing agent incorporated in its discrete particles which comprises mixing an unfoamed mass of the thermoplastic resinous material a quantity of self-reacting exothermus substance which is inert to the expandable thermoplastic resinous material in an amount adequate upon self-reaction to generate sufficient heat to raise the temperature of the unfoamed mass to a foaming temperature without thermal degradation thereof, placing the resulting mixture in a confining mold form; and reacting the exothermus substance to generate sufficient heat within the mass to soften the mass and cause expansion of the blowing agent in the discrete particles in the mass to expand the mass to a foam structure within the limits of the mold form.

4. The method of claim 3 and including the step of mixing a vaporizable, heat-absorbent coolant liquid with the unfoamed mass of the thermoplastic resinous material.

5. Method for expanding into a molded, sandwich construction foam structure an expandable granular thermoplastic resinous material containing a blowing agent incorporated in its discrete particles which comprises mixing with an unfoamed mass of the thermoplastic resinous material a quantity of a self-reacting exothermus substance which is inert to the expandable thermoplastic resinous material in an amount adequate upon self-reaction to generate sufficient heat to raise the temperature of the unfoamed mass to a foaming temperature without thermal degradation thereof and which reacts to an adhesive product; placing the resulting mixture in a confining mold form; and reacting the exothermus substance to generate sufficient heat within the mass to soften the mass and cause expansion of the blowing agent in the discrete particles in the mass to expand the mass to a foam structure within the limits of the mold form to bond said foam structure with said mold form by the adhesive product of the reacted exothermus substance to form a sandwich molded foam structure wherein the mold form surrounding the expanded thermoplastic resinous material is laminated integral therewith.

6. Method for expanding into a foam structure an expandable granular thermoplastic alkenyl aromatic resinous material which contains in its composition at least about 50 percent by weight of at least one alkenyl aromatic compound having the general formula $$Ar—CR=CH_2$$

wherein Ar is an aromatic radical and R is selected from the group consisting of a hydrogen atom and a methyl radical, said granular thermoplastic alkenyl aromatic resinous material containing a blowing agent incorporated in its discrete particles, which comprises mixing with an unfoamed mass of the thermoplastic alkenyl aromatic resinous material a quantity of a self-reacting exothermus substance which is inert to the expandable thermoplastic alkenyl aromatic resinous material in an amount adequate upon self-reaction to generate sufficient heat to raise the temperature of the unfoamed mass to a foaming temperature without thermal degradation thereof and reacting the exothermus substance to generate sufficient heat within the mass to soften the mass and cause expansion of the blowing agent in the discrete particles in the mass to expand the mass into a foam structure.

7. The method of claim 6 wherein self-reacting exothermus substance comprises an epoxide resin.

8. Method for expanding into a foam structure a granular expandable thermoplastic alkenyl aromatic resinous material which contains in its composition at least about 50 percent by weight of at least one alkenyl aromatic compound having the general formula $Ar—CR=CH_2$ wherein Ar is an aromatic radical and R is selected from the group consisting of a hydrogen atom and a methyl radical, said granular thermoplastic alkenyl aromatic resinous material containing a blowing agent incorporated in its discrete granules, which comprises mixing with the unfoamed mass of the thermoplastic resinous material a quantity of a self-reacting exothermus substance which is inert to the expandable thermoplastic alkenyl aromatic resinous material in an amount adequate upon self-reaction to generate sufficient heat to raise the temperature of the unfoamed mass to a foaming temperature without thermal degradation thereof and a vaporizable, heat-absorbing, coolant liquid; and reacting the exothermus substance to generate sufficient heat within the mass to soften the mass and cause expansion of the blowing agent in the discrete particles in the mass to expand the mass into a foam structure wherein excessive heat is dissipated by vaporization of said coolant liquid.

9. Method for expanding into a foam structure an expandable granular polystyrene containing a blowing agent incorporated in its discrete particles which comprises mixing with each part by weight of an unfoamed mass of the polystyrene at least about 0.3 part by weight of an epoxide resin, and a curing agent for said resin, and reacting the epoxide resin to generate heat at a temperature at least in the neighborhood of about 185–190° F. within the mass to soften the mass and cause expansion of the blowing agent in the discrete particles in the mass to volumetrically expand it between about 3 and 15 times its original volume into a foam structure.

10. Method for expanding into a foam structure an expandable granular polystyrene containing a blowing agent incorporated in its discrete particles which comprises mixing each part by weight of an unfoamed mass of the polystyrene within the neighborhood of about 1.5–1.6 parts by weight of an epoxide resin, and a curing agent for said resin, and including a separate blowing agent for said resin and a vaporizable, heat-absorbing coolant liquid in said mass; and reacting the epoxide resin to generate heat at a temperature at least in the neighborhood of about 185–190° F. within the mass to soften the mass and cause expansion of the blowing agent in the discrete particles in the mass to expand the mass into a foam structure having a volume between about 3 and 15 times its original volume, wherein excessive heat is dissipated by vaporization of said coolant liquid.

11. The method of claim 10 wherein the epoxide resin is a bisphenol A-epichlorohydrin resin.

12. The method of claim 10 wherein the coolant liquid  is ethanol.

13. Self-expanding mass for the preparation of foam structures which comprises an intimate mixture of a granular thermoplastic resinous material containing a blowing agent incorporated in its discrete particles and a self-reacting exothermus substance in a quantity which is adequate, upon its reaction, to generate sufficient heat within the mass without thermal degradation thereof to soften the mass and cause expansion of the blowing agent in the discrete particles in the mass to expand the mass to a foam structure, said thermoplastic resinous material being selected from the group consisting of polymeric resins that contain in their composition at least about 50 percent by weight of at least one alkenyl aromatic compound having the formula: $Ar—CR=CH_2$, wherein Ar is an aromatic radical and R is selected from the class consisting of hydrogen and methyl, and polymers of methyl methacrylate.

14. Self-expanding mass for the preparation of foam structures which comprises an intimate mixture of a granular thermoplastic resinous material containing a blowing agent incorporated in its discrete particles; a self-reacting exothermus substance in a quantity which is adequate, upon its reaction, to generate sufficient heat within the mass without thermal degradation thereof to soften the mass and cause expansion of the blowing agent in the discrete particles in the mass to expand the mass to a foam structure; and a vaporizable, heat-absorbing coolant liquid in a quantity which is adequate to dissipate, by its vaporization, excessive heat generated by the reaction of said exothermus substance, said thermoplastic resinous material being selected from the group consisting of polymeric resins that contain in their composition at least about 50 percent by weight of at least one alkenyl aromatic compound having the formula: $Ar-CR=CH_2$, wherein Ar is an aromatic radical and R is selected from the class consisting of hydrogen and methyl, and polymers of methyl methacrylate.

15. The self-expanding mass of claim 13 wherein the self-reacting exothermus substance is comprised of an epoxide resin.

16. The self-expanding mass of claim 13 wherein the self-reacting exothermus substance is comprised of a bisphenol A-epichlorohydrin resin and an amine curing agent for said resin.

17. Self-expanding mass for the preparation of foam structures which comprises an intimate mixture of a granular thermoplastic alkenyl aromatic resinous material which contains in its composition at least about 50 percent by weight of at least one alkenyl aromatic compound having the general formula $Ar-CR=CH_2$ wherein Ar is an aromatic radical and R is selected from the group consisting of a hydrogen atom and a methyl radical, said granular thermoplastic alkenyl aromatic resinous material containing a blowing agent incorporated in its discrete particles; at least about 0.3 part by weight, for each part by weight of said thermoplastic alkenyl aromatic resinous material, of an epoxide resin; and between about 6 and 40 parts by weight, per hundred parts of the resin, of an amine curing agent for said epoxide resin.

18. The self-expanding mass of claim 17 wherein the epoxide resin is a bisphenol A-epichlorohydrin resin.

19. The self-expanding mass of claim 17 wherein the curing agent for said epoxide resin is a polyamine.

20. The self-expanding mass of claim 17 and including a vaporizable, heat-absorbing coolant liquid for dissipating excessive heat generated by the reaction of said epoxide resin.

21. The self-expanding mass of claim 17 and including between about 3 and 20 percent by weight of ethanol, based on the weight of the thermoplastic alkenyl aromatic resinous material.

22. The self-expanding mass of claim 17 and including a separate blowing agent for said exothermus substance.

23. The self-expanding mass of claim 17 wherein the expandable thermoplastic alkenyl aromatic resin is polystyrene.

24. The self-expanding mass of claim 17 wherein the expandable thermoplastic alkenyl aromatic resin is polyvinyltoluene.

25. A molded article comprising a foam structure of an expanded thermoplastic alkenyl aromatic resinous material which contains in its composition at least about 50 percent by weight of at least one alkenyl aromatic compound having the general formula $Ar-CR=CH_2$ wherein Ar is an aromatic radical and R is selected from the group consisting of a hydrogen atom and a methyl radical and containing interdispersed therein an adhesive reinforcing network of a reacted epoxide resin.

26. A molded article comprising a foam structure of an expanded thermoplastic alkenyl aromatic resinous material which has been expanded to a volume between about 3 and 15 times its original unexpanded volume which contains in its composition at least about 50 percent by weight of at least one alkenyl aromatic compound having the general formula $Ar-CR=CH_2$ wherein Ar is an aromatic radical and R is selected from the group consisting of a hydrogen atom and a methyl radical and containing interdispersed therein an adhesive reinforcing network of a reacted epoxide resin, said foam structure being enveloped in a thin, tough, tightly-adhering skin of incompletely expanded thermoplastic alkenyl aromatic resinous material.

27. The article of claim 26 wherein the thermoplastic alkenyl aromatic resinous material is polystyrene.

28. The article of claim 26 wherein the thermoplastic alkenyl aromatic resinous material is polyvinyltoluene.

29. A composite article comprising a mold form which is bonded so as to be integrally attached and laminated to at least a portion of the surface of a foam structure of an expanded thermoplastic alkenyl aromatic resinous material which contains in its composition at least about 50 percent by weight of at least one alkenyl aromatic compound having the general formula $Ar-CR=CH_2$ wherein Ar is an aromatic radical and R is selected from the group consisting of a hydrogen atom and a methyl radical and containing interdispersed therein an adhesive reinforcing network of a reacted epoxide resin which reacted epoxide resin is adhesively bonding said laminated mold form and said foam structure.

30. The article of claim 29 wherein the thermoplastic alkenyl aromatic resinous material is polystyrene.

31. The article of claim 29 wherein the thermoplastic alkenyl aromatic resinous material is polyvinyltoluene.

References Cited in the file of this patent

UNITED STATES PATENTS

| | | |
|---|---|---|
| 2,376,653 | Boyer | May 22, 1945 |
| 2,623,023 | Koroly | Dec. 23, 1952 |
| 2,728,702 | Simon et al. | Dec. 27, 1955 |
| 2,739,134 | Parry et al. | Mar. 20, 1956 |
| 2,739,950 | Nelson | Mar. 27, 1956 |
| 2,740,743 | Pace | Apr. 3, 1956 |
| 2,761,870 | Payne | Sept. 4, 1956 |
| 2,770,406 | Lane | Nov. 13, 1956 |
| 2,787,809 | Stastny | Apr. 9, 1957 |
| 2,806,812 | Merz | Sept. 17, 1957 |
| 2,831,820 | Aase et al. | Apr. 22, 1958 |
| 2,862,834 | Hiler | Dec. 2, 1958 |
| 2,894,918 | Killoran et al. | July 14, 1959 |
| 2,895,173 | Atticks | July 21, 1959 |

FOREIGN PATENTS

| | | |
|---|---|---|
| 714,474 | Great Britain | Aug. 25, 1954 |

OTHER REFERENCES

Epoxy Resins in Glass-Cloth Laminates—Silver et al.: Modern Plastics; November 1950; pages 113, 114, 116, 118, 120, 122; page 116 particularly relied upon.

Microballoons—Modern Plastics, vol. 32, No. 12 (August 1955), pages 100 and 101.